United States Patent
Watson

(10) Patent No.: US 6,493,023 B1
(45) Date of Patent: Dec. 10, 2002

(54) METHOD AND APPARATUS FOR EVALUATING THE VISUAL QUALITY OF PROCESSED DIGITAL VIDEO SEQUENCES

(75) Inventor: Andrew B. Watson, Los Gatos, CA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/266,962

(22) Filed: Mar. 12, 1999

(51) Int. Cl.[7] .................. H04N 17/00; H04N 17/02; H04N 7/12; H04N 11/12; G06K 9/00; G06K 9/40; G06K 9/36; G06K 9/38

(52) U.S. Cl. .................. 348/180; 348/184; 348/192; 348/438.1; 348/455; 382/167; 382/162; 382/254; 382/260; 382/272; 382/286

(58) Field of Search .................. 348/180, 184, 348/192, 438.1, 455, 416.1, 422.1; 382/162, 167, 254, 260, 276, 282, 286; 702/69, 81

(56) References Cited

U.S. PATENT DOCUMENTS

| | | | |
|---|---|---|---|
| 4,455,634 A | | 6/1984 | Efron et al. .................. 369/58 |
| 5,274,445 A | * | 12/1993 | Overton et al. ............. 358/139 |
| 5,313,280 A | * | 5/1994 | Straus .................. 348/181 |
| 5,426,512 A | | 6/1995 | Watson .................. 358/426 |
| 5,446,492 A | | 8/1995 | Wolf et al. .................. 348/192 |
| 5,465,118 A | | 11/1995 | Hancock et al. ............. 348/396 |
| 5,528,514 A | | 6/1996 | Hancock et al. ............. 364/514 |
| 5,574,500 A | | 11/1996 | Hamada et al. ............. 348/180 |
| 5,574,663 A | | 11/1996 | Ozcelik et al. ............. 364/514 |
| 5,596,364 A | | 1/1997 | Wolf et al. .................. 348/192 |

(List continued on next page.)

FOREIGN PATENT DOCUMENTS

| | | |
|---|---|---|
| WO | WO 98/01999 | 1/1998 |
| WO | WO 98/02844 | 1/1998 |
| WO | WO 98/11687 | 3/1998 |

OTHER PUBLICATIONS

A.B. Watson, G.Y. Yang, J.A. Solomon, and J. Villasensor, "Visibility of Wavelet Quantization Noise," IEEE Transactions on Image Processing, 6(8), 1164–1175 (1997).

(List continued on next page.)

*Primary Examiner*—John Miller
*Assistant Examiner*—Paulos M. Natnael
(74) *Attorney, Agent, or Firm*—Robert M. Padilla

(57) ABSTRACT

A Digital Video Quality (DVQ) apparatus and method that incorporate a model of human visual sensitivity to predict the visibility of artifacts. The DVQ method and apparatus are used for the evaluation of the visual quality of processed digital video sequences and for adaptively controlling the bit rate of the processed digital video sequences without compromising the visual quality. The DVQ apparatus minimizes the required amount of memory and computation. The input to the DVQ apparatus is a pair of color image sequences: an original (R) non-compressed sequence, and a processed (T) sequence. Both sequences (R) and (T) are sampled, cropped, and subjected to color transformations. The sequences are then subjected to blocking and discrete cosine transformation, and the results are transformed to local contrast. The next step is a time filtering operation which implements the human sensitivity to different time frequencies. The results are converted to threshold units by dividing each discrete cosine transform coefficient by its respective visual threshold. At the next stage the two sequences are subtracted to produce an error sequence. The error sequence is subjected to a contrast masking operation, which also depends upon the reference sequence (R). The masked errors can be pooled in various ways to illustrate the perceptual error over various dimensions, and the pooled error can be converted to a visual quality measure.

32 Claims, 6 Drawing Sheets

U.S. PATENT DOCUMENTS

| | | | | |
|---|---|---|---|---|
| 5,612,900 | A | | 3/1997 | Azadegan et al. ........... 364/514 |
| 5,621,429 | A | | 4/1997 | Yamaashi et al. ............ 345/119 |
| 5,621,660 | A | | 4/1997 | Chaddha et al. ............. 364/514 |
| 5,629,780 | A | | 5/1997 | Watson ........................ 358/432 |
| 5,684,714 | A | | 11/1997 | Yogeshwar et al. ......... 364/514 |
| 5,686,964 | A | | 11/1997 | Tabatabai et al. ........... 348/420 |
| 5,706,002 | A | * | 1/1998 | Meehan et al. ................ 341/67 |
| 5,719,966 | A | | 2/1998 | Brill et al. ................... 382/260 |
| 5,731,839 | A | * | 3/1998 | Panaro ........................ 348/416 |
| 5,734,677 | A | | 3/1998 | Liew et al. .................. 375/240 |
| 5,764,284 | A | | 6/1998 | Stoker ......................... 348/181 |
| 5,798,788 | A | * | 8/1998 | Meehan et al. ............. 348/180 |
| 5,818,520 | A | | 10/1998 | Janko et al. ................. 348/192 |
| 5,926,226 | A | * | 7/1999 | Proctor et al. .............. 348/422 |
| 5,991,458 | A | * | 11/1999 | Kunitake et al. ........... 382/254 |
| 6,044,397 | A | * | 3/2000 | Eleftheriadis et al. ...... 709/217 |
| 6,057,882 | A | * | 5/2000 | van den Branden Lambrecht et al. ........................... 348/192 |
| 6,075,561 | A | * | 6/2000 | Janko .......................... 348/180 |
| 6,236,756 | B1 | * | 5/2001 | Kimura et al. .............. 382/239 |
| 6,239,834 | B1 | * | 5/2001 | Miyaji et al. ............... 348/193 |

OTHER PUBLICATIONS

A.B. Watson, "Perceptual Optimization of DCT Color Quantization Matrices," IEEE International Conference on Image Processing, 1–5 (1994).

T. Hamada, S. Miyaji, and S. Matsumoto, "Picture Quality Assessment System By Three–Layered Bottom–Up Noise Weighting Considering Human Visual Perception," Society of Motion Picture and Television Engineers, 179–192 (1997).

C.J.v.d.B. Lambrecht, "Color Moving Pictures Quality Metric," International Conference on Image Processing, I, 885–888 (1996).

A.B. Watson, "Multidimensional Pyramids in Vision and Video," Representations of Vision: Trends and Tacit Assumptions in Vision Research, A. Gorea, 17–26, Cambridge University Press, Cambridge (1991).

A.B. Watson, "Perceptual–Components Architecture For Digital Video," Journal of the Optical Society of America A, 7(10), 1943–1954 (1990).

A.A. Webster, C.T. Jones, M.H. Pinson, S.D. Voran, and S. Wolf, "An Objective Video Quality Assessment System Based On Human Perception," Human Vision, Visual Processing, and Digital Display IV, SPIE Proceedings, 1913, 15–26 (1993).

S. Wolf, M.H. Pinson, A.A. Webster, G.W. Cermak, and E.P. Tweedy, "Objective And Subjective Measures Of MPEG Video Quality," Society of Motion Picture and Television Engineers, 160–178 (1997).

H. Peterson, A.J. Ahumada, Jr. and A. Watson, "An Improved Detection Model for DCT Coefficient Quantization," SPIE Proceedings, 1913, 191–201 (1993).

A.B. Watson and J.A. Solomon, "A model of Visual Contrast Gain Control and Pattern Masking," Journal of the Optical Society A, 14, 2378–2390 (1997).

A.B. Watson, "Toward a Perceptual Video Quality Metric," Conference on Human Vision and Electronic Imaging III, SPIE vol. 3299, 139–147 (Jan. 1998).

* cited by examiner

METHOD AND APPARATUS FOR EVALUATING THE VISUAL QUALITY OF PROCESSED DIGITAL VIDEO SEQUENCES

CROSS-REFERENCE TO RELATED APPLICATIONS

The present application claims the priority of co-pending provisional patent application Ser. No. 60/077,862, filed on Mar. 13, 1998, which is incorporated herein in its entirety.

ORIGIN OF THE DISCLOSURE

The invention described herein was made by an employee of the National Aeronautics and Space Administration and it may be manufactured and used by and for the United States Government for governmental purposes without the payment of royalties thereon or therefore.

BACKGROUND OF THE INVENTION

1. Field of the Invention

The present invention relates to a method and apparatus for the evaluation of the visual quality of processed digital video sequences. One common form of processing is compression to reduce the bit-rate of digital video. The invention can be used in various applications such as the automatic and continuous monitoring of processing of digital video sequences for transmission as High Definition Television (HDTV) or Direct Broadcast System (DBS) TV. More particularly, the present invention relates to a Digital Video Quality (DVQ) apparatus and method that incorporate a model of human visual sensitivity to predict the visibility of artifacts and the visual quality of processed video.

2. Description of Related Art

Considerable research has been conducted in the field of data compression, especially the compression of digital images. Digital images comprise a rapidly growing segment of the digital information stored and communicated by science, commerce, industry and government. Digital image transmission has gained significant importance in highly advanced television systems, such as high definition television using digital information. Because a relatively large number of digital bits are required to represent digital images, a difficult burden is placed on the infrastructure of the computer communication networks involved with the creation, transmission and re-creation of digital images. For this reason, there is a need to compress digital images to a smaller number of bits, by reducing redundancy and invisible image components of the images themselves.

A system that performs image compression is disclosed in U.S. Pat. No. 5,121,216 of Chen et al. and is incorporated herein by reference. The '216 patent describes a transform coding algorithm for a still image, wherein the image is divided into small blocks of pixels. For example, each block of pixels can be either an 8×8 or 16×16 block. Each block of pixels undergoes a two dimensional transform to produce a two dimensional array of transform coefficients. For still image coding applications, a Discrete Cosine Transform (DCT) is utilized to provide the transform.

In addition to the '216 patent, the DCT is also employed in a number of current and future international standards, concerned with digital image compression, commonly referred to as JPEG and MPEG, which are acronyms for Joint Photographic Experts Group and Moving Pictures Experts Group, respectively. After a block of pixels of the '216 patent undergoes a DCT, the resulting transform coefficients are subject to compression by thresholding and quantization operations. Thresholding involves setting all coefficients whose magnitude is smaller than a threshold value equal to zero, whereas quantization involves scaling a coefficient by step size and rounding off to the nearest integer.

Commonly, the quantization of each DCT coefficient is determined by an entry in a quantization matrix. It is this matrix that is primarily responsible for the perceived image quality and the bit rate of the transmission of the image. The perceived image quality is important because the human visual system can tolerate a certain amount of degradation of an image without being alerted to a noticeable error. Therefore, certain images can be transmitted at a low bit rate, whereas other images cannot tolerate degradation and should be transmitted at a higher bit rate in order to preserve their informational content.

The '216 patent discloses a method for the compression of image information based on human visual sensitivity to quantization errors. In the method of '216 patent, there is a quantization characteristic associated with block to block components of an image. This quantization characteristic is based on a busyness measurement of the image. The method of '216 patent does not compute a complete quantization matrix, but rather a single scaler quantizer.

Recent years have seen the introduction and widespread acceptance of several varieties of digital video. These include digital television broadcasts from satellites (DBS-TV), the US Advanced Television System (ATV), digital movies on a compact disk (DVD), and digital video cassette recorders (DV). Such a trend is expected to continue in the near future and to expand to widespread terrestrial broadcast and cable distribution of digital television systems.

Most of these systems depend upon lossy compression of the video stream. Lossy compression can introduce visible artifacts, and indeed there is an economic incentive to reduce bit rate to the point where artifacts are almost visible. Compounding the problem is the "bursty" nature of digital video, which requires adaptive bit allocation based on visual quality metrics, and the economic need to reduce bit rate to the lowest level that yields acceptable quality.

For this reason, there is an urgent need for a reliable means to automatically evaluate the visibility of compression artifacts, and more generally, the visual quality of processed digital video sequences. Such a means is essential for the evaluation of codecs, for monitoring broadcast transmissions, and for ensuring the most efficient compression of sources and utilization of communication bandwidths.

The following references that are incorporated herein by reference, describe visual quality metrics for evaluating, controlling, and optimizing the quality of compressed still images, and incorporate simplified models of human visual sensitivity to spatial and chromatic visual signals:

- A. B. Watson, "Image Data Compression Having Minimum Perceptual Error," U.S. Pat. No. 5,629,780 (1997).
- A. B. Watson, G. Y. Yang, J. A. Solomon, and J. Villasenor, "Visibility of Wavelet Quantization Noise," IEEE Transactions on Image Processing, 6(8), 1164–1175 (1997).
- A. B. Watson, "Perceptual Optimization of DCT Color Quantization Matrices," IEEE International Conference on Image Processing, 1, 100–104 (1994).
- A. B. Watson, "Image Data Compression Having Minimum Perceptual Error," U.S. Pat. No. 5,426,512 (1995).

It would be desirable to extend the still image metrics described in the foregoing references to cover moving images. Most, if not all video quality metrics are inherently models of human vision. For example, if root-mean-squared-error (RMSE) is used as a quality metric, this amounts to the assumption that the human observer is sensitive to the summed squared deviations between reference and test sequences, and is insensitive to aspects such as the spatial frequency of the deviations, their temporal frequency, or their color. The DVQ metric is an attempt to incorporate many aspects of human visual sensitivity in a simple image processing algorithm. Simplicity is an important goal, since one would like the metric to run in real-time and require only modest computational resources.

A number of video quality metrics have been proposed in the following references:

K. T. Tan, M. Ghanbari, and D. E. Pearson, "A Video Distortion Meter," Picture Coding Symposium, 119–122 (1997).

T. Hamada, S. Miyaji, and S. Matsumoto, "Picture Quality Assessment System By Three-Layered Bottom-Up Noise Weighting Considering Human Visual Perception," Society of Motion Picture and Television Engineers, 179–192 (1997).

C. J. v. d. B. Lambrecht, "Color Moving Pictures Quality Metric," International Conference on Image Processing, I, 885–888 (1996).

A. B. Watson, "Multidimensional Pyramids In Vision And Video," Representations of Vision: Trends and Tacit Assumptions in Vision Research, A. Gorea, 17–26, Cambridge University Press, Cambridge (1991).

A. B. Watson, "Perceptual-Components Architecture For Digital Video," Journal of the Optical Society of America A, 7(10), 1943–1954 (1990).

A. A. Webster, C. T. Jones, M. H. Pinson, S. D. Voran, and S. Wolf, "An Objective Video Quality Assessment System Based On Human Perception," Human Vision, Visual Processing, and Digital Display IV, SPIE Proceedings, 1913, 15–26 (1993).

J. Lubin, "A Human Vision System Model for Objective Picture Quality Measurements," International Broadcasters' Convention, Conference Publication of the International Broadcasters' Convention, 498–503 (1997).

S. Wolf, M. H. Pinson, A. A. Webster, G. W. Cermak, and E. P. Tweedy, "Objective And Subjective Measures Of MPEG Video Quality," Society of Motion Picture and Television Engineers, 160–178 (1997).

Some of the video quality metrics described in the foregoing references cover spatial filtering operations employed to implement the multiple, bandpass, spatial filters that are characteristic of human vision. A shortcoming of these video quality metrics is that that if the video quality metrics are not based closely enough upon human perception they can not accurately measure visual quality. Alternatively, if the video quality metrics are based closely upon human perception, they will require significant memory or computational resources that restrict the contexts in which they can be applied.

Therefore, there is still an unsatisfied need for a quality metric for digital video, which is reasonably accurate but computationally efficient.

SUMMARY OF THE INVENTION

A feature of the present invention is to provide a Digital Video Quality (DVQ) apparatus and method that incorporate a model of human visual sensitivity to predict the visibility of artifacts. The DVQ method and apparatus are used for the evaluation of the visual quality of processed or compressed digital video sequences, and for adaptively controlling the bit rate of the processed digital video sequences without compromising the visual quality. The DVQ apparatus minimizes the required amount of memory and computation.

The inventive Digital Video Quality (DVQ) apparatus can be widely used in various commercial applications including but not limited to satellite broadcasting of digital television (DBS-TV), movies on compact disc (DVD), high definition digital television (HDTV), digital video Camcorders (DV), Internet Video, digital terrestrial television broadcasting, and digital cable television distribution.

The present DVQ method offers significant advantages over conventional metrics in that the present DVQ method incorporates a reasonably accurate human vision model into a relatively simple processing architecture. A contributor to such architectural simplicity is the use of discrete cosine transforms (DCT) as a spatial filter bank, since the hardware and software to implement the DCT are widely available, due to its prevalence in most existing standards for video compression. Indeed, in some applications of the present DVQ method, the DCT may have already been computed as part of the digital video compression process.

Another contributor to the architectural simplicity of the present DVQ method is the use of Infinite Impulse Response (IIR) Filters in the temporal filtering stages. This reduces the amount of computation and memory required relative to other Finite Impulse Response (FIR) implementations.

The foregoing and other features and advantages of the present invention are achieved by a new DVQ apparatus and method. The input to the DVQ apparatus is a pair of color image sequences: the reference (R) or original non-compressed sequence, and the test (T) or processed sequence. Both sequences (R) and (T) are sampled, cropped, and subjected to color transformations. The sequences are then subjected to blocking and DCT transformation, and the results are transformed to local contrast. The next step is a time filtering operation which implements the human sensitivity to different time frequencies. The results are then converted to threshold units by dividing each DCT coefficient by its respective visual threshold. At the next stage the two sequences are subtracted to produce an error sequence. The error sequence is then subjected to a contrast masking operation, which also depends upon the reference sequence (R). The masked errors can be pooled in various ways to illustrate the perceptual error over various dimensions, and the pooled error can be converted to a visual quality (VQ) measure.

BRIEF DESCRIPTION OF THE DRAWINGS

The features of the present invention and the manner of attaining them, will become apparent, and the invention itself will be understood by reference to the following description and the accompanying drawings, with similar numerals referring to similar or identical elements, wherein.

DETAILED DESCRIPTION OF THE PREFERRED EMBODIMENTS

Figure 1:
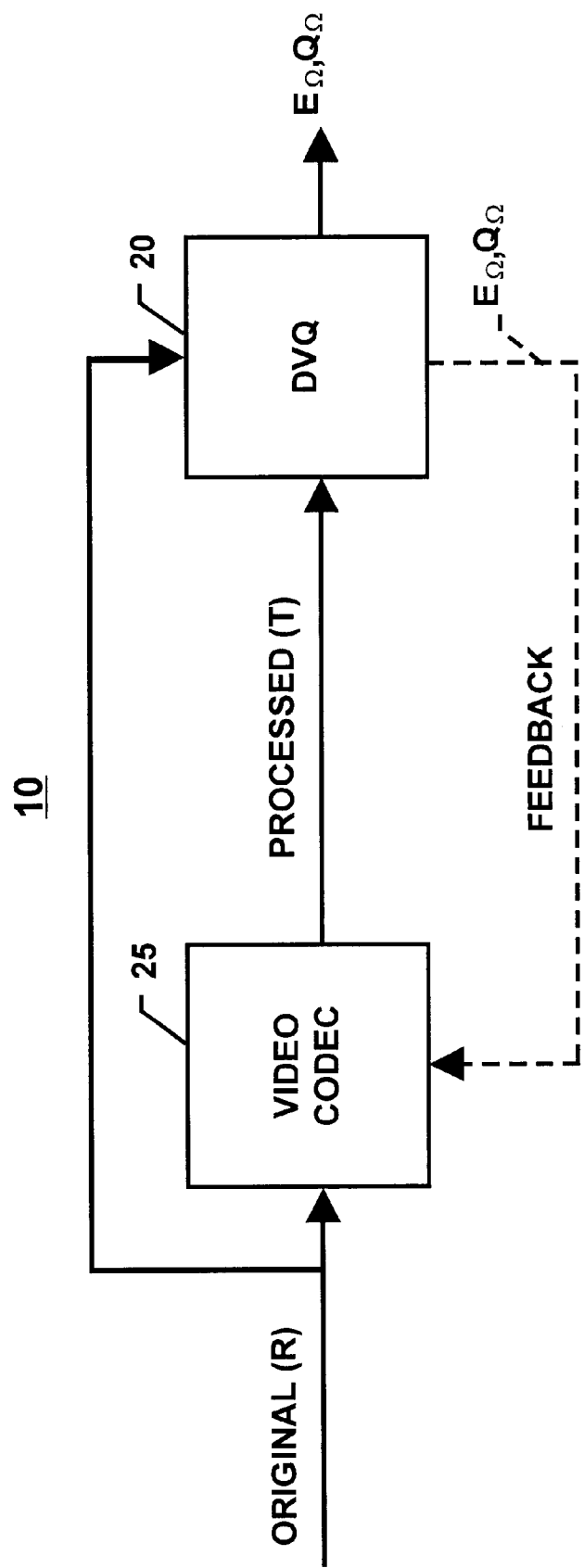
FIG. 1 is a high level block diagram of video encoding system utilizing a DVQ apparatus according to the present invention.

FIG. 1 illustrates a video encoding system 10 that incorporates a DVQ apparatus 20 according to the present invention. In operation, a sequence of original (R) digital video is fed to the input of a video codec 25, and are processed thereby. The video codec 25 is a well known device for coding and decoding video sequences. The sequence of original (R) video and the sequence of processed (T) video generated by the codec 25 are fed to the DVQ apparatus 20 for quality evaluation. The resultant error or quality control signal ($E_Q$, $Q_Q$) can be fed back to the codec 25 for regulating the compression bit rate to correspond to the desired image visual quality.

Figure 2:
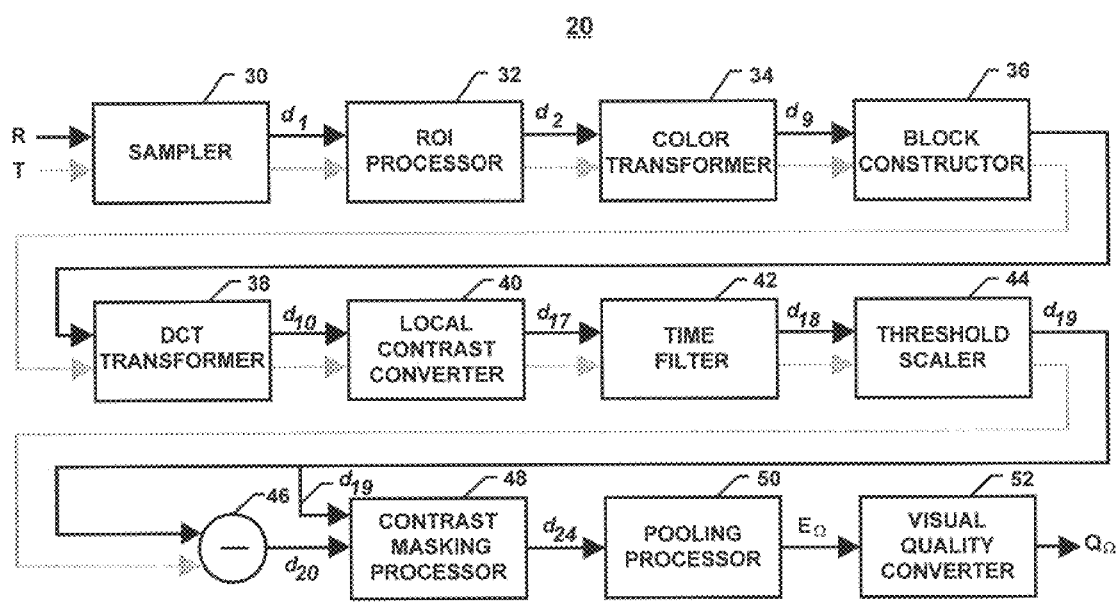
FIG. 2 is a functional block diagram of the DVQ apparatus of FIG. 1 made according to the present invention.

FIG. 2 provides an overview of the processing steps of the DVQ apparatus 20. These steps will be described later in greater detail. The input to the DVQ apparatus 20 is a pair of color video sequences: the original or reference (R) video sequence, and the processed or test (T) video sequence. Each color video sequence includes three color channels which can be, for example, the Y, Cb, and Cr channels used in digital television.

The two sequences (R) and (T) are spatially sampled by a sampler 30 to convert the three color channels to a common spatial resolution. The sampled sequences ($d_1$) are processed by a region-of-interest (ROI) processor 32 to restrict the processing to a region of interest, or to weight some regions more than others. The region of interest sequences ($d_2$) are then processed by a color transformer 34 to convert the color channels to a perceptually relevant color space. The two processed sequences ($d_9$) are then subjected to blocking by a block constructor 36 to divide each frame into blocks, for processing by a discrete cosine transformer (DCT) 38.

The discrete cosine transform 38 converts each of these blocks to a block of frequency (or DCT) coefficients ($d_{10}$), to allow subsequent frequency domain processing. The resulting frequency coefficients ($d_{10}$) are then transformed to local contrast coefficients by a local contrast converter 40, in order to implement a light-adaptation process. The next step is a time filtering operation implemented by a time filter 42, which implements the human sensitivity to different time frequencies. The resulting filtered components ($d_{18}$) are then converted to threshold units ($d_{19}$) by a threshold scaler 44, to implement the human sensitivity to different spatial frequencies. The threshold scaler 44 divides each DCT coefficient by its respective visual threshold.

At the next stage, the threshold units ($d_{19}$) corresponding to the (R) and (T) sequences are subtracted by a subtractor 46, to obtain an error sequence ($d_{20}$). The error sequence ($d_{20}$) is then subjected to a contrast masking operation by a contrast masking processor 48. The contrast masking processor 48 receives the threshold units ($d_{19}$) corresponding to the reference sequence (R) outputted by the threshold scaler 44, to control the masking operation and to generate a masked error sequence ($d_{24}$).

The masked error sequence ($d_{24}$) is pooled by a pooling processor 50, to combine the perceptual error over various dimensions. The pooled error ($E_Q$) can be converted to a visual quality measure ($Q_Q$) by a visual quality converter 52, to provide an output in terms of quality rather than an error value.

Having provided an overview of the processing steps of the DVQ apparatus 20, the DVQ method and apparatus 20 will now be described in greater detail with further reference to FIGS. 3 through 6.

Input Sequences

The input to the DVQ metric is a pair of color video sequences (indexed by s). Each sequence includes an ordered set of color images (indexed by i), and each color image includes a set of three images, one for each of three color channels (indexed by c). Each image includes a set of rows (indexed by y), and each row includes a set of pixels (indexed by x). The first of the two sequences (s=1) is the reference sequence (R), the second (s=2) is the test sequence (T). Typically, the test sequence (T) differs from the reference sequence (R) in the presence of compression or other artifacts. The input color space, indexed by $c_{in}$, is defined in sufficient detail that it can be transformed into CIE coordinates, for example by specifying the gamma and chromaticity coordinates of each color channel. The input is expressed as follows:

$$d_0(s,i,c_{in},y,x_c) \quad (1)$$

The size of the dimensions, i, y, and x depend upon the application. Also, since the DVQ metric can be computed continuously in a pipeline fashion upon a continuous stream of video images, the dimension indexed by i might not have a finite size. Associated with this input is a video image rate ($w_v$) expressed in Hertz (Hz), which specifies the time frequency of images in the input, and a display image rate ($w_d$), which specifies the time frequency of images on the display. Also associated with this input are various other display parameters, such as the color space, gamma, spatial resolution, and veiling light, all of which will be discussed below.

Up-Sampling of Color Components

In many digital color video formats, the three color channels such as Y, Cb, and Cr, are represented with different spatial resolutions. For example, the 4:2:2 variant of CCIR-601 standard digital video, is described in "Recommendation ITU-R BT.601-5, Studio Encoding Parameters of Digital Television for Standard 4:3 and Wide Screen 16:9 Aspect Ratios," (1995). The two color channels (Cb and Cr) in that standard are represented by 360 pixels/line, while the luminance channel (Y) is represented by 720 pixels/line.

According to the present invention, these channels (Y, Cb, and Cr) are converted to a common resolution before color conversion. In this example, the two color channels (Cb, and Cr) are expanded horizontally by a factor of two through a process of up-sampling (US). Up-sampling is performed by the sampler 30 shown in FIG. 2. Although various up-sampling processes are possible, one example is pixel-replication, which is expressed by the following expression:

$$d_1(s,i,c_{in},y,x)=US[d_0(s,i,c_{in},y,x_c)] \quad (2)$$

The up-sampling factors for each direction d (vertical=1, horizontal=2) and color channel c are specified by an array us(c,d). In the example above, this array would be {{1,1},{1,2},{1,2}}.

Region of Interest (ROI) Processing

The sampled sequences ($d_1$) can be spatially cropped by the ROI processor 32 (FIG. 2) to a ROI ($d_2$). This confines the computation of the DVQ apparatus 20 to that region, as expressed by the following equation:

$$d_2(s,i,c_{in},y,x) = \text{ROI}[d_1(s,i,c_{in},y,x)] \quad (3)$$

It is also convenient to make this region an integer multiple of 8×8 pixel blocks, or larger, if color downsampling is used as described below. In an extension, regions-not-of-interest within the region-of-interest may be excluded by means of a binary mask. The region of interest can also be a continuously varying mask of weights, to emphasize some regions more than others.

Color Transformation Operation

Figure 3:
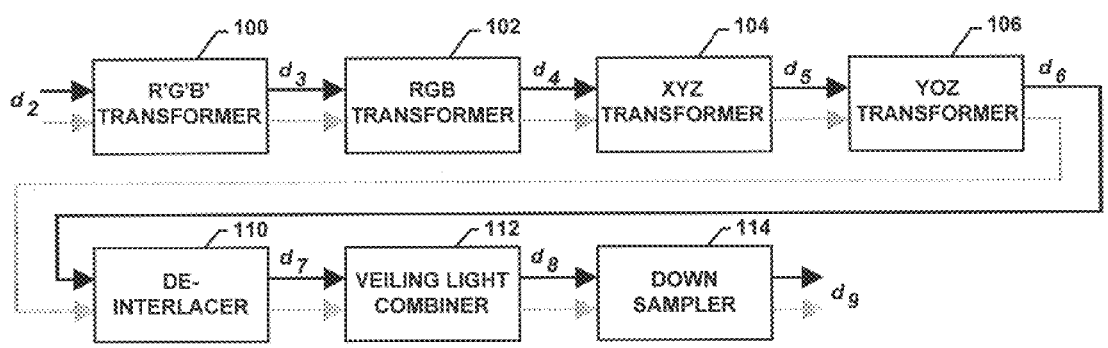
FIG. 3 is a block diagram of a color transformer incorporated in the DVQ apparatus of FIG. 2, and illustrating a color transformation process according to the present invention.

The color transformation process shown in FIG. 3 is implemented by the color transformer 34 (FIG. 2), and will now be described in detail.

Transformation to R'G'B' Color Channels

The ROI sequences ($d_2$) are transformed from their native color space $c_{in}$ to, for example, gamma-corrected color channels R', G', and B' by a R'G'B' transformer 100. For example, if $c_{in}$ corresponds to the YCbCr color space of CCIR-601 standard digital video, then the color channels R', G', and B' are expressed by the following equation:

$$\begin{bmatrix} R' \\ G' \\ B' \end{bmatrix} = {}_{YCbCr}M_{R'G'B'} \begin{bmatrix} Y \\ Cb - 128 \\ Cr - 128 \end{bmatrix} \quad (4)$$

The resulting color transformed sequences ($d_3$) can be expressed by the following equation:

$$d_3(s,i,c,y,x) = \text{R'G'B'}[d_2(s,i,c_{in},y,x)] \quad (5)$$

Transformation to RGB Color Channels

The R'G'B' color channels are converted to RGB color channels by a RGB transformer 102. This conversion is effected by dividing the R'G'B' color channels by 255, clipping to the range [0,1], and raising the result to an exponent γ. The clipping may be necessary because the range of $c_{in}$ values, combined with the interpolation process, can produce excursions outside the permitted range. The resulting color transformed sequences ($d_4$) can be expressed by the following equation:

$$d_4(s,i,c,y,x) = (\lceil \lfloor d_3(s,i,c,y,x)/255 \rfloor_0 \rceil^1)^\gamma \quad (6)$$

Transformation to XYZ Coordinates

The RGB color channels ($d_4$) are then converted to the standard CIE color coordinates XYZ ($d_5$) by a XYZ transformer 104. This is accomplished through multiplication by a user-supplied matrix ${}_{RGB}M_{XYZ}$ that describes the simulated display. In the following expression, the dot product is carried out over the index $C_{RGB}$, $$d_5(s,i,c_{XYZ},y,x) = {}_{RGB}M_{XYZ} \cdot d_4(s,i,c_{RBG},y,x) \quad (7)$$

Transformation to YOZ Coordinates

The XYZ color coordinates ($d_5$) are converted to color coordinates YOZ ($d_6$) by a YOZ transformer 106. This transformation is described in H. Peterson, A. J. Ahumada, Jr. and A. Watson, "An Improved Detection Model for DCT Coefficient Quantization," SPIE Proceedings, 1913, 191–201 (1993), which is incorporated by reference, in modeling perceptual errors in still image compression. In the present invention, the transformation is accomplished through multiplication by a matrix ${}_{XYZ}M_{YOZ}$. In the following expression, the dot product is carried out over the index $c_{XYZ}$:

$$d_6(s,i,c_{YOZ},y,x) = {}_{XYZ}M_{YOZ} \cdot d_5(s,i,c_{XYZ},y,x) \quad (8)$$

The transformations to XYZ and to YOZ can be concatenated into a single matrix multiplication.

Although the operation of the color transformer 34 has been described in terms of specific color transformations (e.g. 100, 102, 104, 106), it should be understood that alternate transformations can be used to arrive at a perceptual color space.

De-Interlacing

If the input sequence (R or T) contains interlaced video fields, then the index i specifies fields, and odd numbered fields contain odd (or even) numbered video lines, and even fields contain even (or odd) video lines. In this case, the first step includes converting the interlaced fields to a progressive sequence ($d_7$) by means of a de-interlacer 110. The de-interlacing process can be implemented, for example, by one of three methods, depending upon the system requirements. Each of these three de-interlacing methods will now be described in detail.

1. De-interlacing by Inserting Blank Lines.

In this method, each field is converted to an image by inserting blank lines into even numbered lines in odd (or even) fields, and odd numbered lines in even (or odd) fields. This method doubles the total number of pixels to be processed. The advantage of this method is that it correctly represents the spatial and time relationship of all video lines. In this method, the display image rate is specified as equal to the video image rate ($w_d = w_v$).

2. De-interlacing by Treating One Field as One Image.

In this method, each field is treated as an image. This method is more efficient than the method of inserting blank lines, since the number of pixels is not increased. However, this method does not completely accurately represent the spatial relationship of lines in odd and even fields. For example, the first lines of odd and even fields are treated as superimposed rather than offset by one line. In this method, the display image rate is specified as equal to the video image rate ($w_d = w_v$).

3. De-interlacing by Treating Two Fields as One Image.

In this method, each pair of odd and even fields are combined into one image; the odd field contributes the odd (or even) lines, and the even field contributes the even (or odd) lines. This method is as efficient as the method above of treating each field as an image, since the number of pixels is not increased (the number of images is halved, but the number of lines/image is doubled). However, this method does not completely correctly represent the temporal relationship of lines in odd and even fields. For example, the odd and even fields are treated as occurring in the same field rather than offset by one field time. In this method, the display image rate is half the video image rate ($w_d = w_v/2$).

The application of the de-interlace operation can be expressed by the following equation:

$$d_7(s,i,c,y,x) = \text{DI}[d_6(s,i,c,y,x)] \quad (9)$$

It should also be noted that this operation can change the size of dimensions i or y, depending on which method is selected. If the input is progressive video, then the de-interlace operation is omitted.

Veiling Light

The next step is the addition of a veiling light to both processed sequences (R) and (T) by a veiling light combiner 112. This veiling light represents the ambient light reflected off the display toward an observer, and is specified by a vector of three numbers v, the CIE XYZ coordinates of the veiling light. To add this veiling light to the sequence, it is first converted to YOZ coordinates, as specified above, and as expressed by the following equation:

$$d_8(s,i,c,y,x)=d_7(s,i,c,y,x)+_{XYZ}M_{YOZ}v \quad (10)$$

where the result vector is understood to be added to each color pixel.

Down-Sampling of Color Components

Since visual acuity for color signals is much lower than that for luminance, it is often possible to lower the resolution of the two color channels O and Z. To achieve this, the color channels O and Z are down-sampled by factors of ds(c,d), where c is color (Y,O, or Z), and d is direction (vertical or horizontal), by means of a down sampler 114. This down-sampling process can be accomplished by any number of well known or available filtering and sampling procedures, such as block-averaging. The color down-sampling step can be expressed by the following equation:

$$d_9(s,i,c,y,x)=DS[d_8(s,i,c,y,x)] \quad (11)$$

Blocked DCT

Referring back to FIG. 2, the color transformed sequences ($d_9$), each image in each color channel is divided into 8×8 pixel blocks by the block constructor 36, and a DCT is applied to each block by the DCT transformer 38. This operation is referred to as blocked DCT (BDCT). The input will typically have been cropped to an integer number of blocks horizontally and vertically. The dimensions of the result are {s, i, c, by, bx, v, u}, where by and bx are the number of blocks in vertical and horizontal directions, respectively, and where v and u are the DCT frequencies that are integers between 0 and 7. The BDCT operation is expressed by the following equation:

$$d_{10}(s,i,c,by,bx,v,u)=BDCT[d_9(s,i,c,y,x)] \quad (12)$$

Local Contrast

Figure 4:
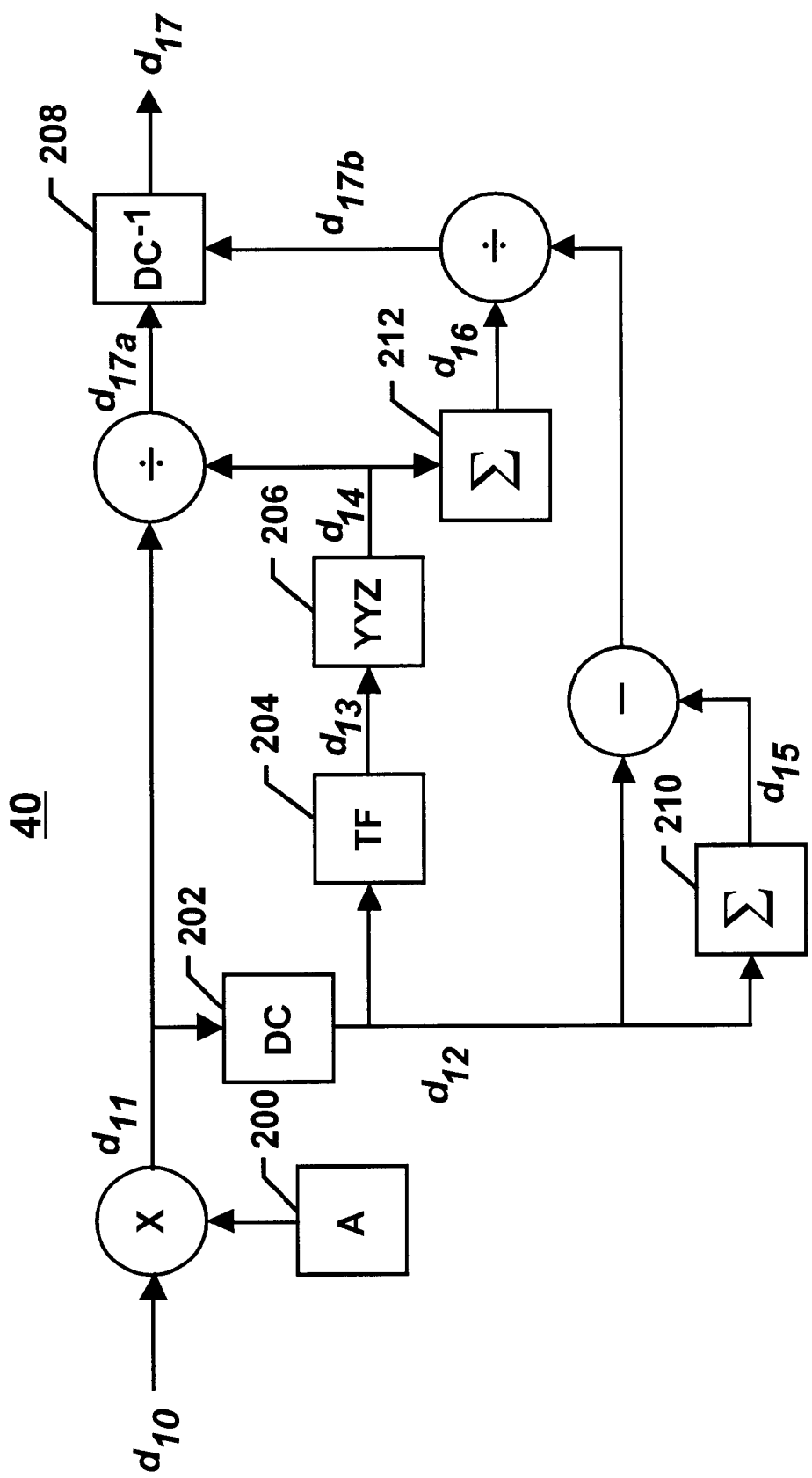
FIG. 4 is a block diagram of a local contrast converter incorporated in the DVQ apparatus of FIG. 2, and illustrating the computational steps of the local contrast process according to the present invention.

FIG. 4 represents a functional block diagram of an exemplary local contrast converter 40. The local contrast converter 40 converts the DOT coefficients ($d_{10}$) to units of local contrast ($d_{17}$). First, the DOT coefficients ($d_{10}$) are adjusted by the relative magnitudes of their coefficients corresponding to a unit contrast basis function (A) 200, as illustrated in the following Table 1, and as expressed by the following equation:

$$d_{11}(s,i,c,by,bx,v,u)=A(v,u)d_{10}(s,i,c,by,bx,v,u) \quad (13)$$

DC coefficients ($d_{12}$) are then extracted from all the blocks ($d_{11}$) by a DC extractor (DC) 202, as expressed by the following equation:

$$d_{12}(s,i,c,by,bx)=d_{11}(s,i,c,by,bx,0,0) \quad (14)$$

The DC coefficients ($d_{12}$) are then time filtered by a time filter (TF) 204, using a first-order, low-pass, IIR filter with a gain of 1, for generating filtered coefficients ($d_{13}$), as expressed by the following equation:

$$d_{13}(s,i,c,by,bx)=b_1 d_{12}(s,i,c,by,bx)+a_1 d_{13}(s,i-1,c,by,bx), \quad (15)$$

where $b_1$ and $a_1$ are filter parameters. If desired, these filter parameters $b_1$ and $a_1$ can also be made into arrays, dependent upon c, v, u.

Since the image rate of the digital video can vary from application to application, it is necessary to define the filter parameters in a way that is independent of the image-rate. For a first order low-pass IIR filter with unit DC gain this can be done by specifying a time constant $\tau_1$ in seconds and a display image-rate $w_d$ in Hz. The filter parameters $a_1$ and $b_1$ can then be expressed by the following equations:

$$a_1 = e^{\frac{-1}{\tau_1 w_d}} \quad (16)$$

$$b_1 = 1 - a_1 \quad (17)$$

Thereafter, a data structure ($d_{14}$) is created in which the elements of the filtered coefficients ($d_{13}$) corresponding to color channel O are discarded and replaced by filtered coefficients ($d_{13}$) corresponding to color channel Y, using a YYZ channel exchanger 206, as expressed by the following equation:

$$d_{14}(s,i,\{Y,O,Z\},by,bx)=d_{13}(s,i,\{Y,Y,Z\},by,bx) \quad (18)$$

If desired, the channel exchanger 206 can also substitute the Y color channel coefficients for the Z color channel coefficients as well. The adjusted DCT coefficients ($d_{11}$) are divided by the filtered DC coefficients ($d_{14}$) on a block-by-block basis, as expressed by the following equation:

$$d_{17a}(s, i, c, by, bx, v, u) = \frac{d_{11}(s, i, c, by, bx, v, u)}{d_{14}(s, i, c, by, bx)} \quad (19)$$

The DC coefficients ($d_{12}$) are converted in a similar fashion. First, a mean DC coefficient ($d_{15}$) is computed over the entire image by an averager 210, as follows:

TABLE 1

Relative magnitudes of unit contrast DCT Basis Functions, A (v, u)

| | u = 0 | 1 | 2 | 3 | 4 | 5 | 6 | 7 |
|---|---|---|---|---|---|---|---|---|
| v = 0 | 1. | 1.38704 | 1.30656 | 1.38704 | 1. | 1.38704 | 1.30656 | 1.38704 |
| 1 | 1.38704 | 1.92388 | 1.81225 | 1.92388 | 1.38704 | 1.92388 | 1.81225 | 1.92388 |
| 2 | 1.30656 | 1.81225 | 1.7071 | 1.81225 | 1.30656 | 1.81225 | 1.7071 | 1.81225 |
| 3 | 1.38704 | 1.92388 | 1.81225 | 1.92388 | 1.38704 | 1.92388 | 1.81225 | 1.92388 |
| 4 | 1. | 1.38704 | 1.30656 | 1.38704 | 1. | 1.38704 | 1.30656 | 1.38704 |
| 5 | 1.38704 | 1.92388 | 1.81225 | 1.92388 | 1.38704 | 1.92388 | 1.81225 | 1.92388 |
| 6 | 1.30656 | 1.81225 | 1.7071 | 1.81225 | 1.30656 | 1.81225 | 1.7071 | 1.81225 |
| 7 | 1.38704 | 1.92388 | 1.81225 | 1.92388 | 1.38704 | 1.92388 | 1.81225 | 1.92388 |

$$d_{15}(s, i, c) = \frac{1}{N_{by}N_{bx}} \sum_{by} \sum_{bx} d_{12}(s, i, c, by, bx) \qquad (20)$$

The mean filtered DC coefficients ($d_{16}$) are computed by another averager 212, as follows:

$$d_{16}(s, i, c) = \frac{1}{N_{by}N_{bx}} \sum_{by} \sum_{bx} d_{14}(s, i, c, by, bx) \qquad (21)$$

The difference between the DC coefficients ($d_{12}$) and their mean ($d_{15}$) is divided by the mean filtered DC coefficients ($d_{16}$), again using the Y component for the denominator of the O component, to generate the DC contrast coefficients ($d_{17b}$), as follows:

$$d_{17b}(s, i, c, by, bx, 0, 0) = \frac{d_{12}(s, i, c, by, bx, 0, 0) - d_{15}(s, i, c)}{d_{16}(s, i, c)} \qquad (22)$$

The insertion of the processed DC contrast coefficients ($d_{17b}$) is labeled $DC^{-1}$. These operations convert each DCT coefficient ($d_{10}$) to a number that expresses the amplitude of the corresponding basis function as a fraction of the time-filtered average luminance in the corresponding block. For the DC coefficients ($d_{12}$), it expresses their difference from the mean DC coefficient ($d_{15}$) as a fraction of the mean filtered DC coefficients ($d_{16}$).

The final local contrast signal ($d_{17}$) is composed of AC coefficients ($d_{17a}$) combined with DC coefficients ($d_{17b}$), by means of a DC insertion process ($DC^{-1}$) 208.

Temporal Filtering

Figure 5:
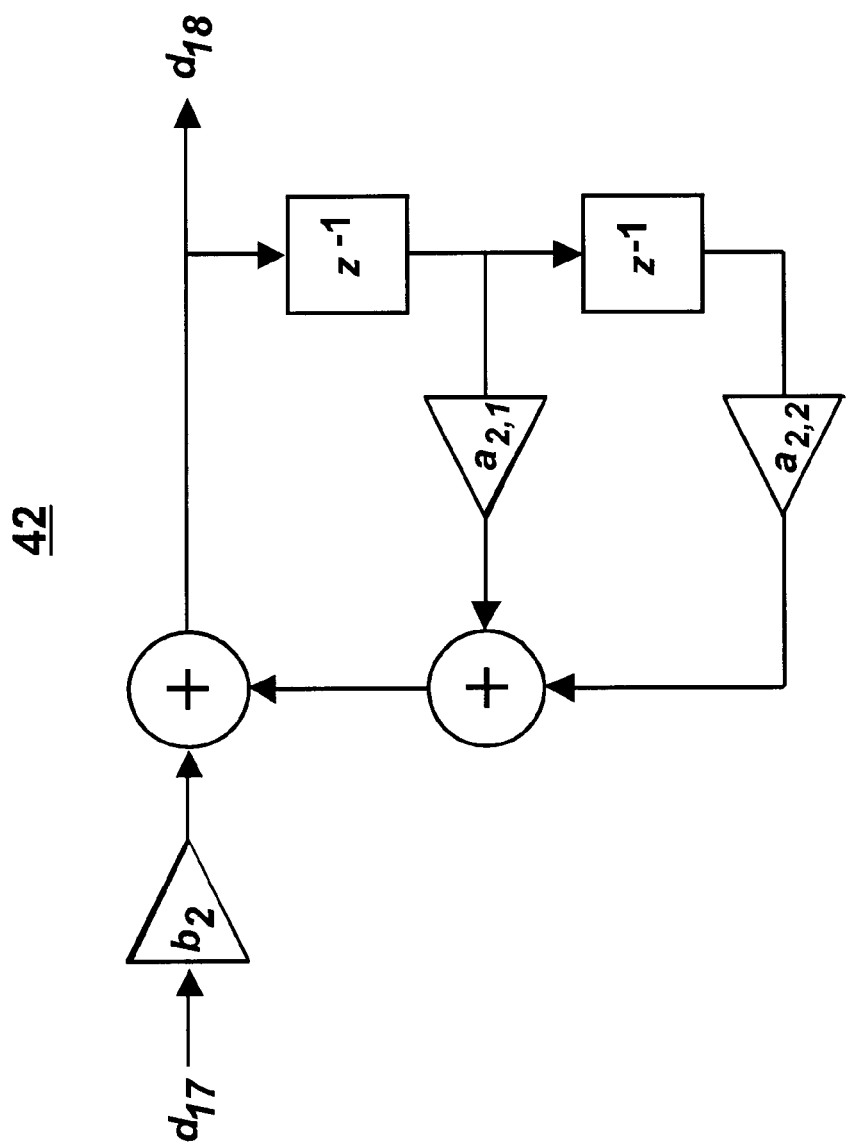
FIG. 5 is a block diagram of a time filter incorporated in the DVQ apparatus of FIG. 2, and illustrating an exemplary temporal filtering process implemented by means of a second order IIR filter according to the present invention.

With further reference to FIG. 5, the local contrast signals ($d_{17}$) are subjected to temporal filtering. In a preferred embodiment, the time filter 42 is a second-order IIR filter. Parameters of the time filter 42 are estimated from calibration data. The filtered coefficients ($d_{18}$) resulting from the time filter 42 can be expressed as follows:

$$d_{18}(s, i, c, by, bx, v, u) = b_2(c, v, u) \, d_{17}(s, i, c, by, bx, v, u) + \sum_{k=1}^{2} a_{2,k}(c, v, u) \, d_{18}(s, i-k, c, by, bx, v, u) \qquad (23)$$

where $b_2$ and $a_{2,k}$ are arrays of filter coefficients. These arrays $b_2$ and $a_{2,k}$ allow different temporal filtering for each DCT frequency and each color. For simplicity, these arrays $b_2$ and $a_{2,k}$ can be made constant, independent of c,v,u, or can be made to depend only on c, or on both c and a simple function of v,u.

Since the image rate of the digital video can vary from application to application, it is necessary to define the filter arrays $b_2$ and $a_{2,k}$ in a way that is independent of image-rate. The present method specifies the time filter 42 in terms of a center frequency $w_c$ and a tuning factor q. If the time filter 42 were constrained to have a magnitude of one at the center frequency $w_c$, and if the display image rate were $w_d$, then the filter arrays $b_2$ and $a_{2,k}$ are expressed by the following equations:

$$a_{2,1} = 2e^{\frac{w_c \pi}{w_d q}} \cos\left(\frac{w_c \pi \sqrt{4 - \frac{1}{q^2}}}{w_d}\right) \qquad (24)$$

$$a_{2,2} = -e^{-\frac{2\pi w_c}{w_d q}} \qquad (25)$$

$$b_2 = |-a_{2,2} - a_{2,1}(-a_{2,2})^{-i,q} + (-a_{2,2})^{-2iq}| \qquad (26)$$

It should be understood that filters of higher or lower order can alternatively be used in the present invention.

DCT Thresholds

Next, a set of contrast thresholds T(c,v,u) is computed for each color and DCT frequency. These thresholds T(c,v,u) are the product of a summation factor S, and three functions, one of the color component c, one of the orientation of the DCT frequency and independent of color, and one a Gaussian function of DCT radial frequency whose parameters depend upon color and further upon the horizontal and vertical processing resolutions pr(c,d). The processing resolutions pr(c,d) are expressed by the following equation:

$$pr(c, d) = \frac{vr(c, d) \, us(c, d)}{ds(c, d)} \qquad (27)$$

where vr(c,d) is the set of resolutions of the input video, in units of pixels/degree of visual angle, and us(c,d) and ds(c,d) are the up- and down-sampling factors described earlier. The thresholds T(c,v,u) are expressed by the following equations:

$$T(c,v,u) = S \, T_0(c) T_1(c,v,u) T_2(v,u) T_3(c) \qquad (28)$$

$$T_1(c, v, u) = \text{Exp}\left(\frac{\pi}{256 f_c^2}(v^2 pr(c, 1)^2 + u^2 pr(c, 2)^2)\right) \qquad (29)$$

$$T_2(u, v) = \frac{2^{\frac{\beta-1}{\beta}}}{1 - \frac{4ru^2v^2}{(u^2+v^2)^2}} \qquad (30)$$

$$T_2(0, 0) = 1/\sqrt{2}$$

$$T_2(u, 0) = 1$$

$$T_2(0, v) = 1$$

$$T_3(c) = \left[\frac{pr(c, 1)}{cr(c, 1)} \frac{pr(c, 2)}{cr(c, 2)}\right]^{\frac{1}{\beta}} \qquad (31)$$

In the latter equation (31), cr(c,d) represent the calibration resolutions for which the parameters $T_0(c)$, $f_c$, r, are specified. They are typically the resolutions at which calibration data were collected.

The processed coefficients ($d_{18}$) are converted by a threshold scaler 44 to threshold units ($d_{19}$), by dividing ($d_{18}$) by their respective spatial thresholds T, as follows:

$$d_{19}(s, i, c, by, bx, v, u) = \frac{d_{18}(s, i, c, by, bx, v, u)}{T(c, v, u)} \qquad (32)$$

Subtraction of Test and Reference

After conversion to threshold units ($d_{19}$), the units corresponding to the two sequences (R) and (T), are subtracted by a subtractor 46 to produce an error sequence ($d_{20}$), as follows:

$$d_{20}(i,c,by,bx,v,u) = d_{19}(2,i,c,by,bx,v,u) - d_{19}(1,i,c,by,bx,v,u) \qquad (33)$$

Contrast Masking

Figure 6:
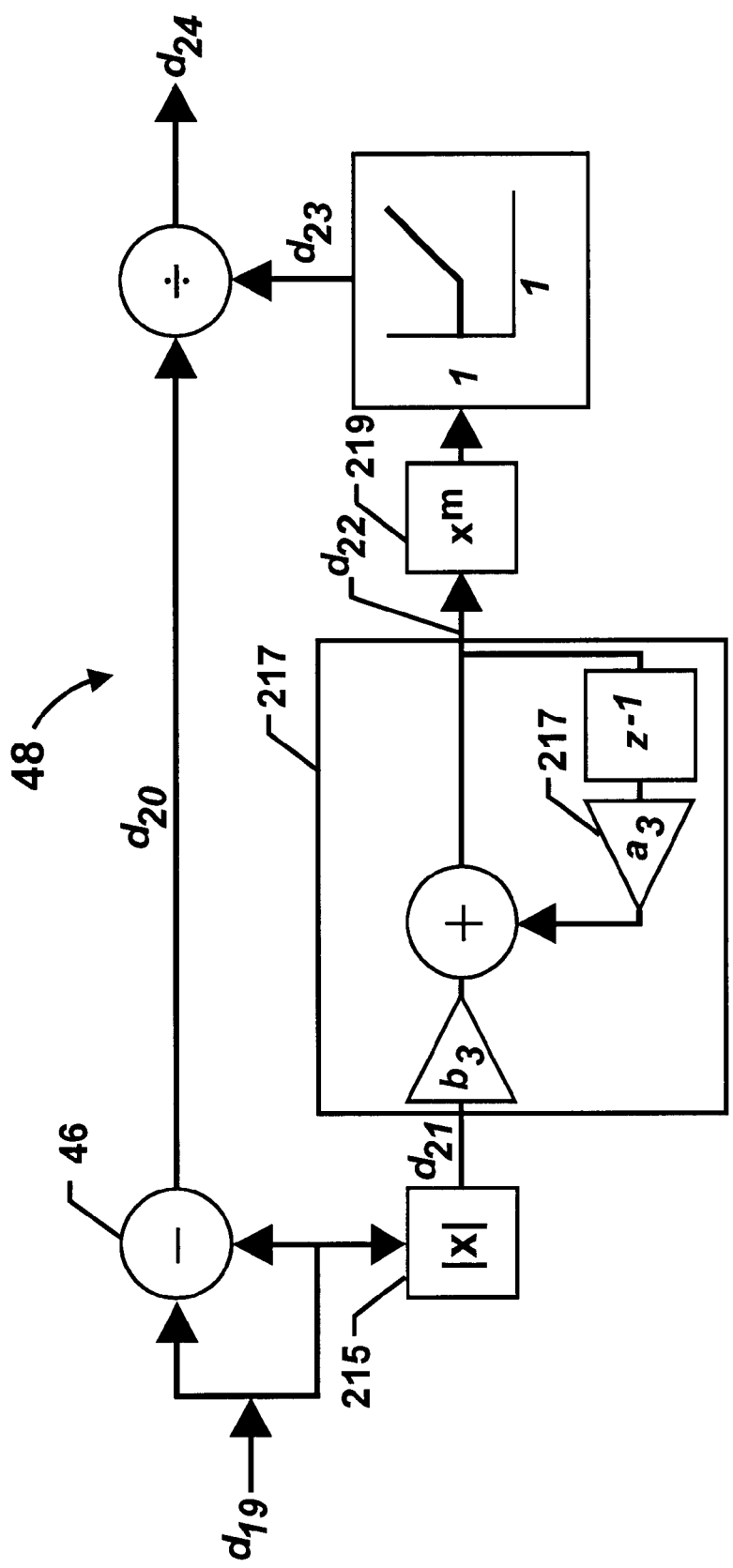
FIG. 6 is a block diagram of a contrast masking processor incorporated in the DVQ apparatus of FIG. 2, and illustrating the computational steps of the contrast masking processor according to the present invention.

With further reference to FIG. 6, contrast masking is accomplished by first constructing a masking sequence ($d_{23}$). The threshold units ($d_{19}$) corresponding to the reference sequence (R) are rectified by a rectifier 215, as follows:

$$d_{21}(i,c,by,bx,v,u) = |d_{19}(1,i,c,by,bx,v,u)| \quad (34)$$

and are then time-filtered by a first-order, low-pass, discrete IIR filter 217, with parameters $a_3$ and $b_3$ to generate a filtered masking sequence ($d_{22}$). Parameter $b_3$ can be derived from a contrast masking gain g, a time constant $t_2$ and the display image-rate $w_d$, as follows:

$$a_3 = \exp\left(\frac{-1}{\tau_2 w_d}\right) \quad (35)$$

$$b_3 = g(1 - a_3)$$

In an alternative embodiment, both $t_2$ and g can be functions of c,v,u. The filtered sequence ($d_{22}$) is then obtained by the following expression:

$$d_{22}(i,c,by,bx,v,u) = b_3 d_{21}(i,c,by,bx,v,u) + a_3 d_{22}(i-1,c,by,bx,v,u) \quad (36)$$

In an alternative embodiment, the values of the filtered masking sequence ($d_{22}$) can be blurred, within each block to implement a form of cross-channel masking, as explained in A. B. Watson and J. A. Solomon, "A Model of Visual Contrast Gain Control and Pattern Masking," Journal of the Optical Society A, 14, 2378–2390 (1997) which is incorporated herein by reference.

The values of the filtered masking sequence ($d_{22}$) are then raised to a power m by an expotentiator 219, wherein any values less than 1 are replaced by 1. The resulting values ($d_{23}$) are used to divide the difference sequence ($d_{20}$), as expressed below for generating a masked error sequence ($d_{24}$):

$$d_{23}(i,c,by,bx,v,u) = \text{Max}[1 d_{22}{}^m(i,c,by,bx,v,u)], \quad (37)$$

$$d_{24}(i,c,by,bx,v,u) = \frac{d_{20}(i,c,by,bx,v,u)}{d_{23}(i,c,by,bx,v,u)} \quad (38)$$

This process resembles the traditional contrast masking result in which contrasts below threshold have no masking effect, and for contrasts above threshold the effect rises as the mth power of mask contrast in the threshold units ($d_{19}$), as explained in G. E. Legge and J. M. Foley, "Contrast Masking in Human Vision," Journal of the Optical Society of America, 70(12), 1458–1471 (1980), which is incorporated herein by reference.

Error Pooling

Referring back to FIG. 2, the dimensions of the resulting sequence ($d_{24}$) are {i, c, by, bx, v, u}, where, i is images, c is color channels, by and bx are the number of blocks in vertical and horizontal directions, and v,u are the vertical and horizontal DCT frequencies. These elementary errors can then be combined over a subset of dimensions $\Omega$, or all dimensions, to yield summary measures of visual error distributed over the complementary dimensions $\overline{\Omega}$. In a preferred embodiment, this summation is implemented using a Minkowski metric as follows:

$$E_\Omega(\overline{\Omega}) = \left(\sum_\Omega |d_{24}(i,c,by,bx,v,u)|^\beta\right)^{\frac{1}{\beta}} \quad \Omega \subseteq \{i,c,by,bx,v,u\} \quad (39)$$

Different applications can require summation over different subsets of dimensions. For example, summation over all dimensions except i would provide a continuous time record of overall quality, while pooling over all dimensions except u and v (over some number of images) would indicate visual error as junction of DCT frequency.

Output

The output of the DVQ apparatus 20 can be either the perceptual error ($E_\Omega$) or a quality measure ($Q_\Omega$) outputted by the visual quality converter 52. The quality measure ($Q_\Omega$) can be computed as follows:

$$Q_\Omega = \frac{2}{1 + E_\Omega} \quad (40)$$

This quality measure ($Q_\Omega$) has a maximum value of 2, which is reached when the perceptual error ($E_\Omega$) is zero, and has a value of 1 when the perceptual error ($E_\Omega$) is at threshold (a value of 1). Other monotonic transforms of the perceptual error ($E_\Omega$) can alternatively be employed.

Exemplary Parameters

The following Table 2 provides exemplary parameters used in the DVQ apparatus 20. Alternative embodiments can use different values of these parameters.

TABLE 2

Parameters of the DVQ Apparatus

| Parameter | Example value | | | Definition | Unit | Equ. |
|---|---|---|---|---|---|---|
| $_{YCbCr}M_{R'G'B'}$ | 1. | −0.002463 | 1.36558 | Color transform matrix | | 4 |
| | 1. | −0.33356 | −0.699821 | | | |
| | 1. | 1.73185 | −0.006097 | | | |
| $_{RGB}M_{XYZ}$ | 40.85 | 32.13 | 18.95 | Color transform matrix | | 7 |
| | 23.20 | 67.62 | 7.90 | | | |
| | 2.049 | 12.20 | 104.75 | | | |
| $_{XYS}M_{YOZ}$ | 0 | 1 | 0 | Color transform matrix | | 8 |
| | 0.47 | −0.37 | −0.1 | | | |
| | 0 | 0 | 1 | | | |
| $T_0$ (c) | {1/83.19, 1/231.09, 1/27.7} | | | Global thresholds {Y, O, Z} | | 28 |
| V | {1, 1, 1} | | | Veiling Light | CIE XYZ | 10 |
| $W_v$ | 60 | | | Video image rate | Hz | |
| $W_d$ | 60 | | | Display image rate | Hz | 24 |
| f (c) | {19.38, 4.85, 4.85} | | | Spatial corner frequency, {Y, O, Z} | cycles/degree | 29 |
| β | 4 | | | Pooling exponent | | 30, 39 |
| r | 0.167 | | | Oblique effect parameter | | 30 |

TABLE 2-continued

Parameters of the DVQ Apparatus

| Parameter | Example value | Definition | Unit | Equ. |
|---|---|---|---|---|
| vr (c, d) | {{32, 32}, {32, 16}, {32, 16}} | Video resolution | pixels/degree | 27 |
| us (c, d) | {{1, 1},{1, 2}, {1, 2}} | Up-sampling factors | | 27 |
| ds (c, d) | {(1, 1},{2, 2}, {2, 2}} | Down-sampling factors | | 27 |
| cr (c, d) | {{32, 32}, {16, 16}, {16, 16}} | Calibration resolutions | pixels/degree | 31 |
| $\tau_1$ | 0.04 | Light adaptation time constant | seconds | 16 |
| $\tau_2$ | 0.04 | Contrast masking time constant | seconds | 35 |
| g | 3 | Contrast masking gain | | 35 |
| m | 0.9 | Contrast masking exponent | | 37 |
| S | 3.7 | Summation factor | | 28 |
| q (c) | {1.3, 1.3, 1.3} | Temporal filter Q factor, {Y, O, Z} | | 24 |
| $w_c$ (c) | {7.31, 7.31, 7.31} | Temporal filter center frequency | Hz | 24 |

It should be clear that alternative embodiments of the DVQ apparatus 20 are possible within the scope of the present invention. In one embodiment, and if additional processing speed were desirable, and if the input were in an appropriate format such as YcbCr color space, the color transforms and gamma conversion can be omitted.

In an alternative embodiment, and if additional processing speed were desirable, and if the input were in an appropriate format such as the blocked DCT of YCbCr color channels, then the DCT transform, as well as the color transforms and gamma conversion can be omitted.

In another alternative embodiment, the subtraction of the test (T) and reference (R) sequences by the subtractor 46 can be postponed until after the contrast masking is implemented by the contrast masking processor 48. The contrast masking process can be combined with an alternate masking formulation in which each DCT coefficient is divided by a rectified, filtered set of neighboring coefficients, with an small added constant.

In still another embodiment, rather than using a single set of time filter coefficients ($b_2$, $a_{2,1}$, $a_{2,2}$), a matrix with one entry for each color and DCT frequency can be used. This does not substantially increase the computational complexity, but improves the accuracy of the temporal filtering model.

One skilled in the art will appreciate that the present invention can be practiced by other than the described embodiments or values, which are presented for purposes of illustration and not of limitation. For example, while the DVQ apparatus and method are described in terms of discrete components, it should be clear that the function of these components can be implemented by means of a software program.

What is claimed is:

1. A digital video quality method for evaluating the visual quality of a processed (T) video sequence relative to an original (R) video sequence, the method comprising:
    sampling the original and processed video sequences to generate sampled sequences ($d_1$) therefrom;
    limiting the processing of said sampled sequences ($d_1$) to a region of interest and generating region of interest sequences ($d_2$) therefrom;
    transforming said region of interest sequences ($d_2$) to local contrast coefficients ($d_{17}$);
    filtering said local contrast coefficients ($d_{17}$) to generate filtered components ($d_{18}$) therefrom;
    converting said filtered components ($d_{18}$) to threshold units ($d_{19}$);
    subtracting said threshold units ($d_{19}$) corresponding to the original (R) and processed (T) sequences to obtain an error sequence ($d_{20}$);
    subjecting said error sequence ($d_{20}$) to a contrast masking operation to generate a masked error sequence ($d_{24}$) therefrom; and
    pooling said masked error sequence ($d_{24}$) to generate a perceptual error ($E_Q$).

2. A method according to claim 1, further including converting said perceptual error ($E_Q$) to a visual quality measure ($Q_Q$), to provide an output in terms of quality.

3. A method according to claim 1, further including feeding back said perceptual error ($E_Q$) to a codec, for regulating a compression bit rate to correspond to a desired image visual quality.

4. A method according to claim 2, further including feeding back said visual quality measure ($Q_Q$) to a codec, for regulating a compression bit rate to correspond to a desired image visual quality.

5. A method according to claim 1, wherein each of said processed (T) video sequence and said original (R) video sequence includes color channels; and
    wherein said color channels are converted by a color transformer to a perceptually relevant color space, to generate color transformed sequences ($d_9$) from said region of interest sequences ($d_2$).

6. A method according to claim 5, further including subjecting said color transformed sequences ($d_9$) to blocking to generates blocks.

7. A method according to claim 6, further including converting said blocks to a block of frequency coefficients ($d_{10}$) by means of a discrete cosine transformer.

8. A method according to claim 7, wherein said block of frequency coefficients ($d_{10}$) are converted to a local contrast signal ($d_{17}$) by means of a local contrast converter; and
    wherein said local contrast signal ($d_{17}$) includes a combination of AC coefficients ($d_{17a}$) and DC coefficients ($d_{17b}$).

9. A method according to claim 8, wherein contrast masking is accomplished by rectifying said threshold units ($d_{19}$).

10. A method according to claim 5, wherein said region of interest sequences ($d_2$) are transformed from their native color space to gamma-corrected color channels R', G', and B' by a R'G'B' transformer.

11. A method according to claim 10, further including converting said color channels R', G', and B' to RGB color channels by a RGB transformer.

12. A method according to claim 11, further including converting said RGB color channels to XYZ color coordinates by a XYZ transformer.

13. A method according to claim 12, further including converting said XYZ color coordinates to YOZ color coordinates by a YOZ transformer.

14. A method according to claim 13, wherein if any of the processed (T) video sequence or the original (R) video sequence contains interlaced video fields, then de-interlacing said interlaced fields to a progressive sequence ($d_7$) by means of a de-interlacer.

15. A method according to claim 14, wherein de-interlacing is implemented by inserting blank lines into even numbered lines in odd fields, and odd numbered lines in even fields.

16. A method according to claim 14, wherein de-interlacing is implemented by inserting blank lines into even numbered lines in even fields, and odd numbered lines in odd fields.

17. A method according to claim 14, wherein de-interlacing is implemented by each pair of odd and even video fields as an image.

18. A method according to claim 14, further including adding a veiling light to said progressive sequence ($d_7$) by means of a veiling light combiner.

19. A method according to claim 1, wherein sampling includes pixel-replication.

20. A digital video quality apparatus with an original (R) video sequence and a processed (T) video sequence being fed thereto, the apparatus comprising:
   a sampler for sampling the original and processed video sequences to generate sampled sequences ($d_1$) therefrom;
   a region-of-interest processor for limiting the processing of said sampled sequences ($d_1$) to a region of interest and for generating region of interest sequences ($d_2$) therefrom;
   a local contrast converter for transforming said region of interest sequences ($d_2$) to local contrast coefficients ($d_{17}$);
   a time filter for filtering said local contrast coefficients ($d_{17}$) and for generating filtered components ($d_{18}$) therefrom;
   a threshold scaler for converting said filtered components ($d_{18}$) to threshold units ($d_{19}$);
   a subtractor for subtracting said threshold units ($d_{19}$) corresponding to the original (R) and processed (T) sequences to obtain an error sequence ($d_{20}$);
   a contrast masking processor for subjecting said error sequence ($d_{20}$) to a contrast masking operation and for generating a masked error sequence ($d_{24}$) therefrom; and
   a pooling processor for pooling said masked error sequence ($d_{24}$) to generate a perceptual error ($E_\Omega$).

21. An apparatus according to claim 20, further including a visual quality converter that converts said perceptual error ($E_\Omega$) to a visual quality measure ($Q_\Omega$), for providing an output in terms of quality.

22. An apparatus according to claim 21, further including a codec to which said perceptual error ($E_\Omega$) is fed back for regulating a compression bit rate to correspond to a desired image visual quality.

23. An apparatus according to claim 21, further including a codec to which said visual quality measure ($Q_\Omega$) is fed back for regulating a compression bit rate to correspond to a desired image visual quality.

24. An apparatus according to claim 20, wherein each of said processed (T) video sequence and said original (R) video sequence includes color channels; and
   a color transformer that converts said color channels to a perceptually relevant color space, for generating color transformed sequences ($d_9$) from said region of interest sequences ($d_2$).

25. An apparatus according to claim 24, further including a block constructor that subjects said color transformed sequences ($d_9$) to blocking, in order to generate blocks.

26. An apparatus according to claim 25, further including a discrete cosine transformer for converting said blocks to a block of frequency coefficients ($d_{10}$).

27. An apparatus according to claim 26, wherein if any of the processed (T) video sequence or the original (R) video sequence contains interlaced video fields, then de-interlacing said interlaced fields to a progressive sequence ($d_7$) by means of a de-interlacer.

28. An apparatus according to claim 27, further including a veiling light combiner for adding a veiling light to said progressive sequence ($d_7$).

29. An apparatus according to claim 28, further including a local contrast converter for converting said block of frequency coefficients ($d_{10}$) to a local contrast signal ($d_{17}$); and
   wherein said local contrast signal ($d_{17}$) includes a combination of AC coefficients ($d_{17a}$) and DC coefficients ($d_{17b}$).

30. A digital video quality apparatus with original (R) video sequence and a processed (T) video signal being fed thereto, the apparatus comprising:
   a sampler for sampling the original and processed video sequences and for generating sampled sequences ($d_1$) therefrom;
   a region-of-interest processor for limiting the processing of said sampled sequences ($d_1$) to a region of interest and for generating region of interest sequences ($d_2$) therefrom;
   a local contrast converter for transforming said region of interest sequences ($d_2$) to local contrast coefficients ($d_{17}$);
   a time filter for filtering said local contrast coefficients ($d_{17}$) and for generating filtered components ($d_{18}$) therefrom;
   a threshold scaler for converting said said filtered components ($d_{18}$) to threshold units ($d_{19}$);
   a subtractor for subtracting said threshold units ($d_{19}$) corresponding to the original (R) and processed (T) sequences to obtain an error sequence ($d_{20}$);
   a contrast masking processor for subjecting said subtracted error sequence ($d_{20}$) to a contrast masking operation and generating a masked error sequence ($d_{24}$); and
   a pooling processor for pooling said error sequence ($d_{20}$) to generate a perceptual error ($E_\Omega$).

31. An apparatus according to claim 30 further including a visual quality convertor for converting said perceptual error ($E_\Omega$) to visual quality measure ($Q_\Omega$) to provide output in terms of quality.

32. A digital quality method for evaluating the visual quality of a processed (T) video sequence relative to an original (R) video sequence, the method comprising:
   sampling the original and processed video sequences and for generating sampled sequences ($d_1$) therefrom;
   limiting the processing of said sampled sequences ($d_1$) to a region of interest and for generating region of interest sequences ($d_2$) therefrom;

transferring said region of interest sequences ($d_2$) to local contrast coefficients ($d_{17}$);

filtering said local contrast coefficients ($d_{17}$) and for generating components ($d_{18}$) therefrom;

subtracting said threshold units ($d_{19}$) to obtain an error sequence ($d_{20}$);

subjecting said error sequence ($d_{20}$) to a contrast masking operation to obtain a masked error sequence ($d_{24}$); and pooling said error sequence ($d_{20}$) to generate a perceptual ($E_\Omega$).

* * * * *